United States Patent
Shao et al.

(10) Patent No.: US 12,393,612 B2
(45) Date of Patent: Aug. 19, 2025

(54) SYSTEMS AND METHODS FOR ENTITY SET EXPANSION

(71) Applicant: Recruit Co., Ltd., Tokyo (JP)

(72) Inventors: Yutong Shao, Mountain View, CA (US); Nikita Bhutani, Mountain View, CA (US); Sajjadur Rahman, Mountain View, CA (US); Estevam Hruschka, Mountain View, CA (US)

(73) Assignee: Recruit Co., Ltd., Tokyo (JP)

( * ) Notice: Subject to any disclaimer, the term of this patent is extended or adjusted under 35 U.S.C. 154(b) by 0 days.

(21) Appl. No.: 18/295,757

(22) Filed: Apr. 4, 2023

(65) Prior Publication Data

US 2024/0338391 A1  Oct. 10, 2024

(51) Int. Cl.
*G06F 17/00* (2019.01)
*G06F 7/00* (2006.01)
(Continued)

(52) U.S. Cl.
CPC ............ *G06F 16/313* (2019.01); *G06F 16/38* (2019.01)

(58) Field of Classification Search
CPC ................ G06F 16/313; G06F 16/38
(Continued)

(56) References Cited

U.S. PATENT DOCUMENTS

| | | | |
|---|---|---|---|
| 2003/0217335 A1* | 11/2003 | Chung | G06F 40/30 707/E17.084 |
| 2004/0236737 A1* | 11/2004 | Weissman | G06F 16/954 707/E17.084 |

(Continued)

OTHER PUBLICATIONS

Al-Moslmi et al., "Named Entity Extraction for Knowledge Graphs: A Literature Overview," IEEE Access, Creative Commons Attribution, Published Feb. 14, 2020, Digital Object Identifier 10.1109/ACCESS.2020.2973928, University of Bergen, Norway (20 pages).

(Continued)

*Primary Examiner* — Pavan Mamillapalli
(74) *Attorney, Agent, or Firm* — Finnegan, Henderson, Farabow, Garrett & Dunner LLP

(57) ABSTRACT

Disclosed embodiments relate to entity set expansion to associate with a text corpus. Techniques can include receiving unstructured data and a set of concepts associated with the data to determine, using a language model, a set of candidate entities in the data associated with the set of concepts, wherein the association is measured based on the relevancy of each candidate entity of the set of candidate entities to context of the data. Techniques can then determine, using a plurality of methods, associations between each candidate entity in the set of candidate entities and each concept in the concept of the set of concepts, wherein the each candidate entity is assigned a rank for each method of the plurality of methods. Techniques can use the assigned ranks to determine a combined rank of the each candidate entity of the set of candidate entities, wherein the combined rank of the each candidate entity is based on the assigned rank of the each candidate entity for the each method of the plurality of methods. Techniques can finally expand the entity set by determining a subset of entities of the set of candidate entities based on the combined rank of each candidate entity, wherein the subset of entities form the expanded entity set associated with the data.

20 Claims, 3 Drawing Sheets

(51) Int. Cl.
   *G06F 16/31* (2019.01)
   *G06F 16/38* (2019.01)
(58) Field of Classification Search
   USPC ......................................................... 707/730
   See application file for complete search history.

(56) References Cited

U.S. PATENT DOCUMENTS

| | | | | |
|---|---|---|---|---|
| 2016/0012119 A1* | 1/2016 | Franceschini | ......... | G06F 16/338 707/722 |
| 2016/0012336 A1* | 1/2016 | Franceschini | ....... | G06F 16/3334 706/55 |
| 2017/0060991 A1* | 3/2017 | Zhang | ..................... | G06F 16/93 |

OTHER PUBLICATIONS

Auer et al., "DBpedia: A Nucleus for a Web of Open Data," University of Pennsylvania, Department of Computer and Information Science Philadelphia, PA 19104, USA (14 pages).
Bamman et al., "An Annotated Dataset of Literary Entities," Proceedings of NAACL-HLT 2019, Minneapolis, Minnesota, Jun. 2-Jun. 7, 2019 (7 pages).
Bhutani et al., "SAMPO: Unsupervised Knowledge Base Construction for Opinions and Implications," (17 pages).
Brazinskas et al., "Few-Shot Learning for Opinion Summarization," arXiv:2004.14884v3 [cs.LG] Oct. 10, 2020 (17 pages).
Chandrasekaran et al., "Deep Neural Query Understanding System at Expedia Group," Conference Paper, Dec. 2020 (10 pages).
Cheng and Erk, "Attending to Entities for Better Text Understanding," The Thirty-Fourth AAAI Conference on Artificial Intelligence (AAAI-20) (8 pages).
Dai and Song, "Neural Aspect and Opinion Term Extraction with Mined Rules as Weak Supervision," arXiv:1907.03750v1 [cs.CL] Jul. 7, 2019 (11 pages).
Devlin et al., "BERT: Pre-training of Deep Bidirectional Transformers for Language Understanding," Proceedings of NAACL-HLT 2019, Minneapolis, Minnesota, Jun. 2-Jun. 7, 2019 (16 pages).
Dey et al., "A Paraphrase and Semantic Similarity Detection System for User Generated Short-Text Content on Microblogs," Proceedings of COLING 2016, the 26th International Conference on Computational Linguistics: Technical Papers, Osaka, Japan, Dec. 11-17, 2016. (11 pages).
Falotico and Quatto, "Fleiss' kappa statistic without paradoxes," Published online: Feb. 13, 2014 © Springer Science+Business Media Dordrecht 2014, Milano, Italy (8 pages).
Goel et al., "Goodwill Hunting: Analyzing and Repurposing Off-the-Shelf Named Entity Linking Systems," Proceedings of NAACL HLT 2021: IndustryTrack Papers, Jun. 6-11, 2021. ©2021 Association for Computational Linguistics (9 pages).
Hearst, "Automatic Acquisition of Hyponyms from Large Text Corpora," To Appear in the Proceedings of the Fourteenth International Conference on Computational Linguistics, Nantes France, Jul. 1992 (8 pages).
Huang et al., "Guiding Corpus-based Set Expansion by Auxiliary Sets Generation and Co-Expansion," © 2020 IW3C2 (International World Wide Web Conference Committee), published under Creative Commons CC By 4.0 License. ACM ISBN 978-1-4503-7023-3/20/04 (11 pages).
Huang et al., "CoRel: Seed-Guided Topical Taxonomy Construction by Concept Learning and Relation Transferring," KDD '20, Aug. 23-27, 2020, Virtual Event, USA (9 pages).
Huang et al., "NUT-RC: Noisy User-generated Text-oriented Reading Comprehension," Proceedings of the 28th International Conference on Computational Linguistics, Barcelona, Spain (Online), Dec. 8-13, 2020 (12 pages).
Inan et al., "HSEarch: semantic search system for workplace accident reports," arXiv:2103.12420v1 [cs.IR] Mar. 23, 2021 (6 pages).
Karamanolakis et al., "TXtract: Taxonomy-Aware Knowledge Extraction for Thousands of Product Categories," arXiv:2004.13852v2 [cs.CL] May 1, 2020 (14 pages).
Lashkari et al., "Neural embedding-based indices for semantic search," Information Processing and Management 56 (2019) 733-755 (23 pages).
Li et al., "Subjective Databases," arXiv:1902.09661v4 [cs.DB] Jul. 24, 2019 (15 pages).
Liu et al., "Pre-train, Prompt, and Predict: A Systematic Survey of Prompting Methods in Natural Language Processing," © 2023 Copyright held by the owner/author(s). Publication rights licensed to ACM (35 pages).
Mamou et al., "Term Set Expansion based NLP Architect by Intel AI Lab," arXiv:1808.08953v2 [cs.AI] Oct. 15, 2018 (6 pages).
Mao et al., "Octet: Online Catalog Taxonomy Enrichment with Self-Supervision," Applied Data Science Track Paper, KDD '20, Aug. 23-27, 2020, Virtual Event, USA (11 pages).
Mbouopda and Yonta, "Named Entity Recognition in Low-resource Languages using Cross-lingual distributional word representation," Department of Computer Sciences, University of Yaounde I, Cameroon, IRD, UMMISCO, F-93143, Bondy, France, ARIMA Journal, vol. 33, (2020) (11 pages).
Miao et al., "Snippext: Semi-supervised Opinion Mining with Augmented Data," WWW '20, Apr. 20-24, 2020, Taipei, Taiwan, © 2020 IW3C2 (International World Wide Web Conference Committee), published under Creative Commons CC-BY 4.0 License (12 pages).
Paris and Suchanek, "Non-Named Entities—The Silent Majority," Telecom Paris, Institut Polytechnique de Paris, France (5 pages).
Petroni et al., "Language Models as Knowledge Bases?," arXiv:1909.01066v2 [cs.CL] Sep. 4, 2019 (11 pages).
Rong et al., "EgoSet: Exploiting Word Ego-networks and User-generated Ontology for Multifaceted Set Expansion," WSDM'16, Feb. 22-25, 2016, San Francisco, CA, USA. (10 pages).
Shang et al., "Automated Phrase Mining from Massive Text Corpora," Digital Object Identifier 10.1109/TKDE.2018.2812203 (14 pages).
Shen et al., "SetExpan: Corpus-Based Set Expansion via Context Feature Selection and Rank Ensemble," Department of Computer Science, University of Illinois at Urbana-Champaign, USA (16 pages).
Shen et al., "HiExpan: Task-Guided Taxonomy Construction by Hierarchical Tree Expansion," Research Track Paper, KDD 2018, Aug. 19-23, 2018, London, United Kingdom (10 pages).
Suchanek et al., "YAGO: A Core of Semantic Knowledge Unifying WordNet and Wikipedia," WWW 2007, May 8-12, 2007, Banff, Alberta, Canada, ACM 9781595936547/07/0005 (10 pages).
Takeoke et al., "Low-resource Taxonomy Enrichment with Pretrained Language Models," Proceedings of the 2021 Conference on Empirical Methods in Natural Language Processing, Nov. 7-11, 2021 (12 pages).
Van Der Wees et al., "Five Shades of Noise: Analyzing Machine Translation Errors in User-Generated Text," Proceedings of the ACL 2015 Workshop on Noisy User-generated Text, Beijing, China, Jul. 31, 2015 (10 pages).
Xu et al., "The Seventh Workshop on Noisy User-generated Text (W-NUT 2021)," Proceedings of the Conference, Nov. 11, 2021 Online, © 2021 The Association for Computational Linguistics (18 pages).
Yan et al., "Progressive Adversarial Learning for Bootstrapping: A Case Study on Entity Set Expansion," Chinese Information Processing Laboratory, State Key Laboratory of Computer Science, Institute of Software, Chinese Academy of Sciences, Beijing, China, University of Chinese Academy of Sciences, Beijing, China, arXiv:2109.12082v1 [cs.CL] Sep. 24, 2021 (10 pages).
Yu et al., "Corpus-based Set Expansion with Lexical Features and Distributed Representations" Short Research Papers 3A: AI, Mining, and others, SIGIR '19, Jul. 21-25, 2019, Paris, France (4 pages).
Zhang et al., "Empower Entity Set Expansion via Language Model Probing," University of Illinois at Urbana-Champaign, IL, USA, University of California San Diego, CA, USA, arXiv:2004.13897v2 [cs.CL] Jun. 29, 2020 (11 pages).

* cited by examiner

SYSTEMS AND METHODS FOR ENTITY SET EXPANSION

BACKGROUND

Natural language processing systems are used to understand information records to generate and expand entity sets to perform various knowledge base tasks such as answering questions and reasoning. Current systems of entity expansion are evaluated on limited size entity sample set regardless of the actual size of the entity set used in real world. Further existing natural language processing systems can only suit a certain text corpus in a certain domain or extract a limited set of entities from input text corpus. There is a need for techniques and systems for multi-purpose use entity set expansion methods that can adapt to different domains and different types of text corpus. Such techniques and systems can respond to the needs of modern natural language systems in a timely and cost-effective manner.

SUMMARY

Certain embodiments of the present disclosure relate to a system for entity set management. The system includes one or more processors executing processor-executable instructions stored in one or more memory devices to perform a method. The method may include receive unstructured data and a set of concepts associated with the data, determine using a language model, a set of candidate entities in the data associated with the set of concepts, wherein the association is measured based on the relevancy of each candidate entity of the set of candidate entities to context of the data, determine using a plurality of methods, associations between each candidate entity in the set of candidate entities and each concept in the concept of the set of concepts, wherein the each candidate entity is assigned a rank for each method of the plurality of methods, determine a combined rank of the each candidate entity of the set of candidate entities, wherein the combined rank of the each candidate entity is based on the assigned rank of the each candidate entity for the each method of the plurality of methods, and determine a subset of entities of the set of candidate entities based on the combined rank of each candidate entity, wherein the subset of entities form the expanded entity set associated with the data.

According to some disclosed embodiments, a set of concepts includes at least one of: one or more keywords in the data, or descriptions of the one or more keywords in the data.

According to some disclosed embodiments, determining using a language model, a set of candidate entities in the data associated with the set of concepts is based on similarity between the set of candidate entities and the set of concepts.

According to some disclosed embodiments, determining using a language model, a set of candidate entities in the data associated with the set of concepts further comprises: determine a concept size number of each concept of the set of concepts, and determine the set of candidate entities based on the concept size number of each concept of the set of concepts.

According to some disclosed embodiments, determining concept size number of each concept of the set of concepts further comprises: determine count of the set of candidate entities to extract from the data.

According to some disclosed embodiments, determining count of the set of candidate entities to extract from the data is based on a concept of the set of concepts.

According to some disclosed embodiments, determining count of the set of candidate entities to extract from the data is based on domain of the data.

According to some disclosed embodiments, determining using a plurality of methods, associations between each candidate entity in the set of candidate entities and each concept in the concept of the set of concepts further comprises: determine embeddings of the each candidate entity of the set of candidate entities, determine embeddings of the each concept of the set of concepts; and determine similarity between the embeddings of the each entity and the embeddings of the each concept.

According to some disclosed embodiments, each candidate entity is assigned a rank for each method of the plurality of methods based on the similarity between a candidate entity of the set of candidate entities and a concept of the set of concepts.

According to some disclosed embodiments, each candidate entity is assigned a rank for each method of the plurality of methods based on the similarity between a candidate entity and other candidate entities of the set of candidate entities.

According to some disclosed embodiments, determining a combined rank of the each candidate entity further comprises: measure compatibility of a first method and a second method of the plurality of methods, and determine combined rank of ranks assigned by the first method and the second method, wherein the first method is compatible with the second method.

According to some disclosed embodiments, the first method is compatible with the second method when a first set of candidate entities of the set of candidate entities associated with the set of concepts by the first method are divergent from a second set of candidate entities associated the set of concepts.

According to some disclosed embodiments, the subset of entities includes multifaceted entities, amount of vague entities, and amount of non-named entities.

According to some disclosed embodiments, the operations performed by one or more processors further comprise: generating a knowledge graph based on the subset of the entities.

According to some disclosed embodiments, the operations performed by one or more processors further comprise: evaluating effectiveness of a method of the plurality of methods to determine associations between each candidate entity in the set of candidate entities and each concept in the concept of the set of concepts.

According to some disclosed embodiments, the effectiveness of a method of the plurality of methods is evaluated based on at least one of amount of multifaceted entities, amount of vague entities, or amount of non-named entities Certain embodiments of the present disclosure relate to computer implemented method performing entity set expansion on data utilizing an entity set management system. The method may include receiving unstructured data and a set of concepts associated with the data, determining using a language model, a set of candidate entities in the data associated with the set of concepts, wherein the association is measured based on the relevancy of each candidate entity of the set of candidate entities to context of the data, determining using a plurality of methods, associations between each candidate entity in the set of candidate entities and each concept in the concept of the set of concepts, wherein the each candidate entity is assigned a rank for each method of the plurality of methods, determining a combined rank of the each candidate entity of the set of candidate entities, wherein the combined rank of the each candidate entity is based on the assigned rank of the each candidate entity for the each method of the plurality of methods, and determining a subset of entities of the set of candidate entities based on the combined rank of each candidate entity, wherein the subset of entities form the expanded entity set associated with the data.

Certain embodiments of the present disclosure relate to a non-transitory computer readable medium including instructions that are executable by one or more processors to cause a system to perform a method for performing entity set expansion on data. The method may include receiving unstructured data and a set of concepts associated with the data, determining using a language model, a set of candidate entities in the data associated with the set of concepts, wherein the association is measured based on the relevancy of each candidate entity of the set of candidate entities to context of the data, determining using a plurality of methods, associations between each candidate entity in the set of candidate entities and each concept in the concept of the set of concepts, wherein the each candidate entity is assigned a rank for each method of the plurality of methods, determining a combined rank of the each candidate entity of the set of candidate entities, wherein the combined rank of the each candidate entity is based on the assigned rank of the each candidate entity for the each method of the plurality of methods, and determining a subset of entities of the set of candidate entities based on the combined rank of each candidate entity, wherein the subset of entities form the expanded entity set associated with the data.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

Figure 1:
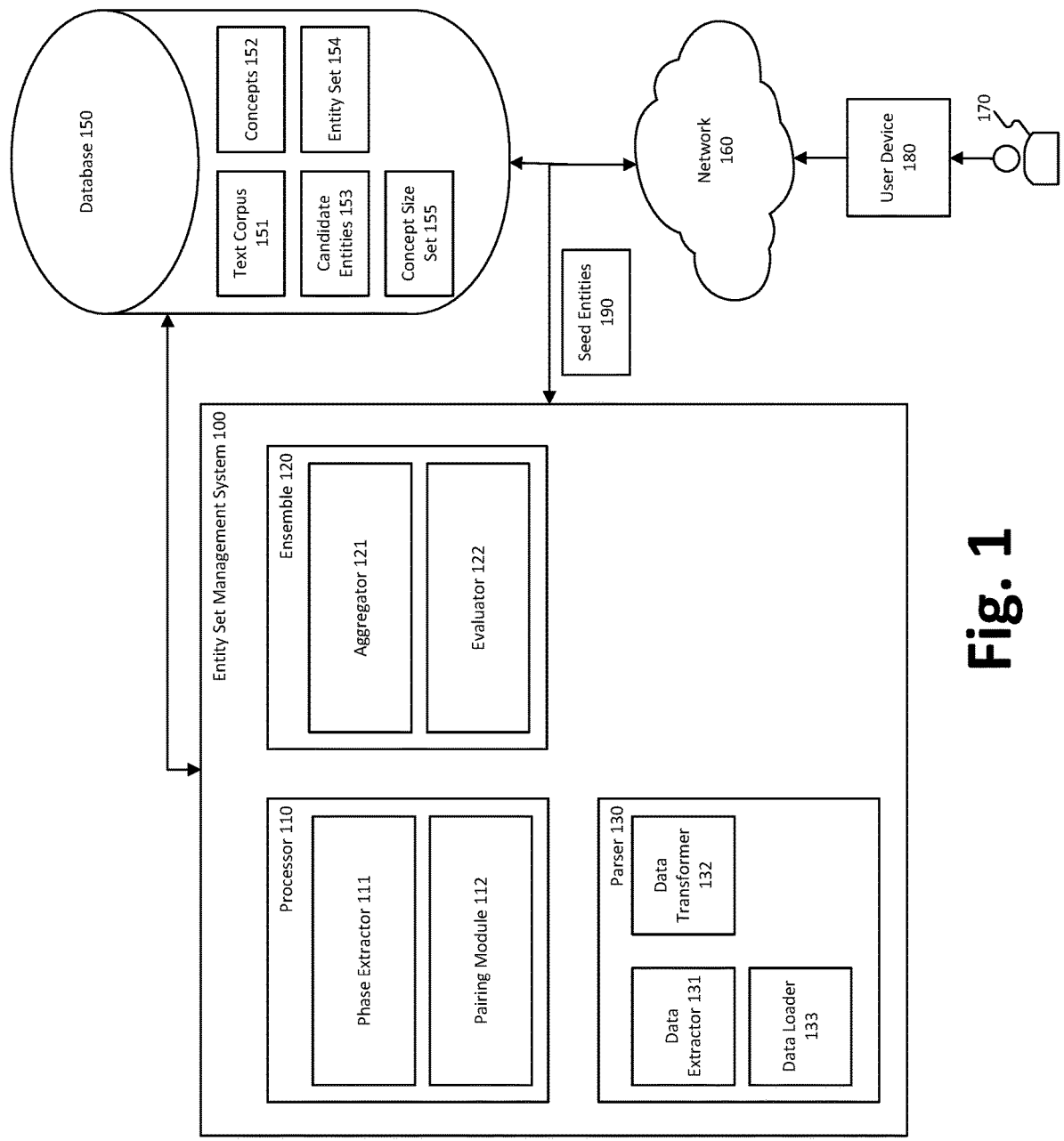
FIG. 1 is a block diagram showing example components of entity set management system, consistent with embodiments of the present disclosure.

In the following detailed description, numerous details are set forth to provide a thorough understanding of the disclosed example embodiments. It is understood by those skilled in the art that the principles of the example embodiments can be practiced without every specific detail. The embodiments disclosed are exemplary and are not intended to disclose every possible embodiment consistent with the claims and disclosure. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The embodiments described herein provide technologies and techniques for using existing entity set expansion methods to generate new expanded entity sets used in various natural language applications.

Entity sets can help generate knowledge graphs used in systems to perform natural language processing tasks such as answering questions and semantic searches. Entity set expansion techniques increase the seed set of entities to include other entities belonging to the same semantic concept. For example, an entity set related to the hotel rooms concept ('amenities') may include a seed entity set ('tv,' 'coffee,' 'breakfast'), and the expanded entity set may include entities ('hair dryer,' 'minibar') that are still associated with the same semantic concept, hotel room. The existing entity set expansion systems use manually curated data of a particular domain to extract entities related to a semantic concept in that domain for entity set expansion and generate knowledge graphs. Knowledge graphs generated using manually curated data can quickly become obsolete when certain entities are no longer used or have a different meaning. For example, an entity set in the jobs domain may require different skills at different times for the same role (e.g., software engineer), representing a semantic concept. In another example, an entity set in the job domain may list a new set of roles, such as data scientist or data engineer, and new skills that were not present at an earlier time. Further, such knowledge graphs with manually curated data have limited data and can only result in small knowledge graphs.

The systems and methods describe embodiments below of a novel entity set expansion technique that automates the entity set expansion and uses curated structured and unstructured data as input to generate an entity set. Such techniques are beneficial in generating knowledge graphs in new domains with less or no curated data and not waiting on curated data resulting in obsolete entity sets and knowledge graphs.

Further, the described embodiments provide another distinct advantage over existing entity set expansion techniques used for natural language processing. Unlike other processes, the entity set expansion techniques described in the disclosed embodiments can be used for different types of both well curated data (e.g., Wikipedia, Job postings sites) and user generated unstructured data (e.g., customer reviews) by automating entity set expansion using the same methods irrespective of domain of the data and the structure of the date. The entity set expansion systems and methods described below understand the limitations (e.g., lack of clarity) of unstructured/un-curated data. For example, an entity set in travel domain may include a nearby attractions entity set that can include 'casino' entity, which is a generic word that does not clarify if it is a particular casino or casinos in general. The entity 'casino' may have been retrieved from non-curated data such as customer reviews on a travel website and may not include many details.

Additionally, the described system and methods include a new benchmark to evaluate the effectiveness of entity set expansion. The existing benchmarks are limited to use a small set of entities. The new benchmark and the related entity set expansion system described below helps consider a large set of entities by using multiple entity set expansion methods together to include entities that may be identified by only a subset of methods. The entity set expansion system described below identifies the best set of entity expansion methods to combine by determining the benchmark that evaluates the compatibility of existing entity set expansion methods. By combining entity set expansion methods, the embodiments disclosed herein can predict entities with different characteristics to include in an expanded entity set.

FIG. 1 is a block diagram showing example components of entity set management system 100, consistent with embodiments of the present disclosure. Entity set management system 100 may comprise a processor 110 to determine candidate entities to use for generating an entity set (e.g., entity set 154). In some embodiments, the candidate entities can be supplied by user input, other systems, other data sources, or feedback from entity set management system 100 or its components. Entity set management system 100 may use a generated entity set to generate a knowledge graph used in an AI device to answer user questions. As illustrated in FIG. 1, entity set management system 100 may include components such as processor 110, ensemble 120, and parser 130. Entity set management system 100 may also include a data store such as database 150. Entity set management system 100 uses ensemble 120 to determine entities in candidate entities 153 to include in entity set 154 in database 150. In some embodiments, entity set management system 100 may use data stored in database 150 as input to train the machine learning (ML) models of processor 110 and ensemble 120. Entity set management system 100 may use existing transformer models in processor 110 and ensemble 120. For example, entity set management system 100 may use an existing language model BERT to identify candidate entities 153 and associate them to concepts 152. In some embodiments, entity set management system 100 may use processor 110 to pre-process the text corpus 151 to identify entities associated with concepts 152 by ensemble 120.

As illustrated in FIG. 1, processor 110 may include phase extractor 111, pairing module 112. Phase extractor 111 identifies entities used to generate and expand entity set 154. Phase extractor 111 identifies entities from text corpus 151 provided as input data from database 150. Text corpus 151 may be unstructured user generated text (e.g., customer reviews) or structured data curated by users (e.g., Wikipedia).

Phase extractor 111 may identify candidate entities 153 by extracting keywords and key phrases from text corpus 151. Phase extractor 111 may extract keywords and key phrased based on seed entities 190. In some embodiments, seed entities 190 may be provided as input by user 170 using user device 180. Phase extractor 111 may extract keywords and key phrases with similar meaning as seed entities 190 from text corpus 151. Phase extractor 111 may include a pre-trained language model to extract keywords and key phrases used to identify candidate entities 153. Phase extractor 111 may determine the importance of an entity based on extracted keyword or key phrases to include in candidate entities 153. Phase extractor 111 may determine importance of an entity based on its relevancy to the context of text corpus 151. Phase extractor 111 may determine context based on the domain (e.g., travel, jobs, etc) of the text corpus. In some embodiments, phase extractor 111 may determine context based on the topic in the text used for extracting keywords and key phrases to identify candidate entities 153.

Pairing module 112 associates the candidate entities 153 identified by phase extractor 111 with concepts 152. Pairing module 112 helps generate entity set 154 by ordering the candidate entities 153 by rank and associating them with a concept in concepts 152. Pairing module 112 may employ various entity set expansion methods to associate the candidate entities 153 to concepts 152. Entity set expansion methods may include corpus based methods and language model based methods.

Corpus based methods may obtain contextual features and distributed representations of candidate entities 153 from text corpus 151 and use them to estimate similarity of candidate entities 153 to seed entities 190. Language based methods may use a pre-trained language model to probe to rank the candidate entities 153. Language based methods rely on knowledge stored in language models instead of using them to obtain contextualized representations of candidate entities 153 in text corpus 151. In some embodiments, pairing module 112 may use existing entity set expansion methods, for example, SetExpan, CGExpan, Embedding baseline, and LM Probing Baseline that employ corpus based methods and language model based methods.

In some embodiments, pairing module 112 may use string based methods that rely on embeddings of candidate entities 153 to determine associations with concepts 152. Pairing module 112 may determine associations based on the similarity of embeddings of an entity of candidate entities 153 to a concept of concepts 152. Pairing module 112 may generate embeddings of each concept of concepts 152 and each candidate entity of candidate entities 153 identified by phase extractor 111. In some embodiments, pairing module 112 may consider top-k entities of candidate entities 153 similar to a concept of concepts 152 and discard the rest. Pairing module 112 may include a rank assigned to each candidate entity associated with a concept in concepts 152. An entity's rank may be based on the level of similarity to a concept. In some embodiments, pairing module 112 may use order or pattern methods to determine entities to associate with concepts 152. For example, a concept related to a location may associate the candidate entities 153 that represent cities.

Pairing module 112 may use multiple entity set expansion methods to rank identified entities associated with concepts 152 in an iterative manner by executing one method at a time. In some embodiments, multiple entity set expansion methods may be executed simultaneously using a distributed computing system 200, as described in FIG. 2 description below. Candidate entities 153 and their associations with concepts 152 determined by processor 110 may be used by ensemble 120 to identify the final set of entities to include in entity set 154. Ensemble 120 may combine multiple entity set expansion methods used by pairing module 112 to identify the final set of entities in text corpus 151 to include in entity set 154.

As illustrated in FIG. 1, ensemble 120 includes aggregator 121 and evaluator 122 as components to determine the final set of entities of candidate entities 153 to include in entity set 154. Aggregator 121 may aid in combining entity set expansion methods employed by pairing module 112 by aggregating ranks assigned by each method in pairing module 112 for each candidate entity of candidate entities 153 identified by phase extractor 111. Aggregator 121 aggregates ranks to avoid biases presented by models employed by entity set expansion methods used by pairing module 112. Pairing module 112 models may place bias when ranking the candidate entities 153 based on certain key phrases identified by phase extractor 111. In some embodiments, pairing module 112 may place bias based on the context of the text corpus. For example, context may be the topic of text corpus 151. For example, text corpus 151 retrieved from reviews of a trip planning site has a travel context. Certain key phrases or keywords may be deemed important for travel. Aggregator 121 combines entity set expansion methods by combining ranks assigned by each method to generate mean reciprocal rank (MRR).

Aggregator 121 may aggregate multiple ranks using the mean reciprocal rank method. MRR combines ranks assigned to candidate entities in two different methods using different models. MRR combines ranks using the mean average of two ranks. Aggregator 121 does not need any additional training to compute aggregation by computing MRR rank for a combined method for an entity may be computed as follows:

$$MRR(e) = \frac{1}{n}\sum_{i=1}^{n} \frac{1}{r_i(e)}$$

In the above computation of the MRR score of an entity e, n is the number of entity set expansion methods used by pairing module 112 to assign ranks to candidate entities 153 associated with concepts 152. And $r_i(e)$ is the ranking of the candidate entity under a method i.

Evaluator 122 may compute a benchmark to evaluate entity set expansion methods and identify the best combination of entity set expansion methods employed by pairing module 112. In some embodiments, evaluator 122 may also evaluate the effectiveness of each entity expansion method used to associate candidate entities with concepts 152. Evaluator 122 may compute benchmarks that may include multifacetedness (m), which indicates the fraction of candidate entities 153 that are multifaceted entities associated with multiple concepts. In some embodiments, benchmarks may include non-named rate (r), which indicates the fraction of candidate entities that are non-named entities that are not proper nouns in input data (e.g., text corpus 151). In some embodiments, entity set management system 100 may also compute the vagueness (k) of candidate entities 153 as a benchmark.

Entity set management system 100 may use concept size set 155 to determine the number of candidate entities 153 to identify using phase extractor 111. The size of concept size set 155 may vary depending on the number of concepts in concepts 152 to be associated with candidate entities 153. In some embodiments, user 170 may provide concept size set 155 in addition to seed entities 190 as input to entity set management system 100. In some embodiments, entity set management system 100 may dynamically determine concept size set 155 by determining the number of candidate entities 153 to associate with each concept of concepts 152. Phase extractor 111 may use concept size set 155 to determine the number of entities to identify per concept from text corpus 151. In some embodiments, pairing module 112 or aggregator 121 may use concept size set 155 to select the number of entities in candidate entities 153 to assign ranks using entity set expansion methods or combine ranks.

Evaluator 122 may evaluate the performance of individual entity set expansion methods and a combination of methods by computing metric mean average precision (MAP) of methods with a varying gold-k (kg) value that represents a concept's size in concept size set 155 based on benchmarks described above. Gold-k may equal concept size, i.e., the number of entities of candidate entities 153 associated with a concept of concepts 152. Gold-k is not linked to a fixed MAP value, as it can adapt to different concept sizes. MAP value can give an estimate of the recall rate of identifying candidate entities (e.g., candidate entities 153) that can be used to estimate the effectiveness of entity set expansion methods in real-world settings with large concept sizes. By using a large kg value, entity set management system 100 can include more instances of candidate entities 153 with target characteristics: multifaceted, vague, and non-named in entity set 154.

Different characteristics of user-generated text, such as text corpus 151 can impact the performance of entity set expansion methods. Evaluator 122 may determine the impact of text corpus 151 on an entity set expansion methods based on the comparison of the number of entities identified in text corpus 151 that exhibit one of the target characteristics: multifaceted, non-named, or vague to the number of entities that do not exhibit such target characteristics. Evaluator 122 may consider an entity as identified if it is ranked in the top-kg. Aggregator 121 may reduce the impact of target characteristics by generating novel entity set expansion methods which are a combination of multiple entity set expansion methods. Aggregator 121 ensembles existing entity set expansion methods by combining ranks assigned to entities by an individual entity set expansion method.

Entity set management system 100 may achieve a higher recall of candidate entities 153 in a combination MRR method by combining entity set expansion methods that capture differing contexts and, in the process, predict collections of correct entities with minimal overlap. Aggregator 121 may determine the minimal overlap of methods by selecting methods based on their compatibility. For example, aggregator 121 may measure the compatibility of two entity set expansion methods used for associating the candidate entities 153 to concepts 152 as follows:

$$Comp(m_1, m_2) = \frac{\|P(m_1) \cup P(m_2)\|}{\max(\|P(m_1)\|, \|P(m_2)\|)} - 1,$$

where P(m) is the set of correct entity predictions of method m by predicting their final combined ranks. When one of the correct predictions set of $m_1$ and $m_2$ is a subset of the other, aggregator 121 determines their compatibility value as 0. When the two methods find disjoint sets of correct predictions, aggregator 121 determines their compatibility value as 1.

Aggregator 121 may consider a combination of entity set expansion methods having an MRR value that outperforms both candidate methods by a larger margin. In some embodiments, aggregator 121 may evaluate the effectiveness of combining methods by combining ranks. For example, aggregator 121 may evaluate the effectiveness of a combined MRR method as follows:

$$\mathit{Eff}(m_1, m_2) = \frac{S(m_1 + m_2)}{\max(S(m_1), S(m_2))} - 1$$

where S(m) denotes the performance of method m, and $m_1+m_2$ is the combination of method $m_1$, $m_2$ by combining ranks assigned to candidate entities 153 assigned by pairing module 112 when associating them with concepts 152.

Parser 130 helps in converting entities into a machine-readable format. For example, parser 130 may extract entities in HTML and PDF formats to machine-readable JSON format, providing a hierarchical structure to the entity's content. Parser 130 does not modify the entity's content structure, such as the order of the entity's content or the content itself. Parser 130 may also transform entities without changing the semantic meaning of entities Parser 130 may use a rule-based processor to convert content in entities to a structured format. The hierarchical structure provided for entities processed by parser 130 may depend on the entity type. For example, jobs data tends to have a known structure of title, dates of employments, skills to convert to semi-structured JSON format data. Parser 130 may use an example template schema to convert an entity's content. In some embodiments, parser 130 may generate a schema based on the provided entities. Parser 130 may review multiple entities of the same type to determine the standard schema to convert the entities to semi-structured JSON format data. For example, parser 130 may determine the attributes to use as keys and hierarchical structure of JSON format data based on available entities and their content and order of the content. Parser 130 may parse entities to transform them for use by processor 110 and ensemble 120. Parser 130 may transform entities by replacing certain words with synonyms without compromising the semantic meaning of candidate entities 153.

In some embodiments, parser 130 may retrieve data from a variety of data sources (e.g., external job postings on websites) and process the data into entities so that they may be used with the remainder of entity set management system 100. Parser 130 may further include a data extractor 131, data transformer 132, and data loader 133 modules. Data extractor 131 and data transformer 132 may work together to generate the entities (e.g., candidate entities 153) stored in database 150. Data transformer 132 may connect the disparate data extracted from data sources by data extractor 131 and store it in database 150.

Data extractor 131 retrieves data from different data sources, for example, job posting sites such as Indeed.com or Dice.com, job review sites such as glassdoor.com, and social networks such as LinkedIn. Each of these data sources may represent a different type of data source. For example, a data source may be a database similar to database 150. A data source may represent structured data, such as resumes of candidates. In some embodiments, data sources may be flat files, such as job postings and job reviews. Further, data sources may contain overlapping or completely disparate data sets. In some embodiments, a data source may contain information about a job posting, while other data sources may contain salary information of the position advertised in the job posting and reviews by previous and current employers in a position similar to the one advertised in the job posting. Data extractor 131 may interact with the various data sources, retrieve the relevant data, and provide that data to the data transformer 132.

Data transformer 132 may receive data from data extractor 131 and process the data into standard formats. In some embodiments, data transformer 132 may normalize data such as dates, addresses, and job titles. For example, a data source for job postings may include job titles as strings (for example, engineer, director, manager, etc.), while a data source for job reviews may store job titles as various levels (for example, L1, L2, etc.) within the organization. In this example, data transformer 132 may modify or normalize the data provided through data extractor 131 into a consistent format. Accordingly, data transformer 132 may effectively clean the data provided through data extractor 131 so that all of the data, although originating from a variety of sources, has a consistent format. In some embodiments, data transformer 132 may clean data by combining data from different sources. For example, job reviews data may include pay ranges for each position, but the job postings may not include the pay range. In the second example, data transformer 132 may include the missing pay ranges in the job posting entities generated by parsing web pages of job postings.

Moreover, data transformer 132 may extract additional data points from the data sent by data extractor 131. For example, data transformer 132 may determine if a job is a remote position by extracting separate data fields for job position location and company location. Data transformer 132 may also perform other linear and non-linear transformations and extractions on categorical and numerical data, such as normalization and demeaning. In some embodiments, data transformer 132 may anonymize data extracted by data extractor 131. Data transformer 132 may anonymize data to avoid private data from being used to train machine learning models in entity set management system 100. Data transformer 132 may provide the transformed or extracted data to data loader 133. In some embodiments, data transformer 132 may store the transformed data in database 150 for later use by data loader 133 and other modules of processor 110.

Data loader 133 may receive the normalized data from data transformer 132. Data loader 133 may merge the data into varying formats depending on the specific requirements of entity set management system 100 and store the data in an appropriate storage mechanism such as database 150.

Database 150 can be a Relational Database Management System (RDBMS) (e.g., Oracle Database, Microsoft SQL Server, MySQL, PostgreSQL, or IBM DB2). An RDBMS can be designed to efficiently return data for an entire row, or record, from the database in as few operations as possible. An RDBMS can store data by serializing each row of data in a data structure. In an RDBMS, data associated with a record can be stored serially such that data associated with all categories of the record can be accessed in one operation. Moreover, an RDBMS can efficiently allow access to related records stored in disparate tables. For example, in an RDBMS, tables can be linked by a referential column, and the RDBMS can join tables together to retrieve data for a data structure. In some embodiments, database 150 can be a non-relational database system (NRDBMS) (e.g., XML, Cassandra, CouchDB, MongoDB, Oracle NoSQL Database, FoundationDB, or Redis). A non-relational database system can store data using a variety of data structures, such as, among others, a key-value store, a document store, a graph, and a tuple store. For example, a non-relational database using a document store could combine all of the data associated with a particular identifier into a single document encoded using XML. Database 150 can also be an in-memory database such as Memcached. In some embodiments, the contents of database 150 can exist both in a persistent storage database and in an in-memory database, such as is possible in Redis.

Entity set management system 100 can receive requests for entity set expansion using text corpus 151 over network 160. Network 160 can be a local network, Internet, or a cloud. User 170 can send requests for identifying entities for entity set expansion to entity set management system 100 over network 160. User 170 can interact with entity set management system 100 over user device 180. User device 180 can be a variety of devices such as a tablet, laptop, or portable computer using a web browser or an installed application.

The components of entity set management system 100 can run on a single computer or can be distributed across multiple computers or processors. The different components of entity set management system 100 can communicate over a network (e.g., LAN or WAN) 160 or the Internet. In some embodiments, each component can run on multiple computer instances or processors. The instances of each component of the entity set management system 100 can be a part of a connected network such as a cloud network (e.g., Amazon AWS, Microsoft Azure, Google Cloud). In some embodiments, some, or all, of the components of entity set management system 100 are executed in virtualized environments such as a hypervisor or virtual machine.

Figure 2:
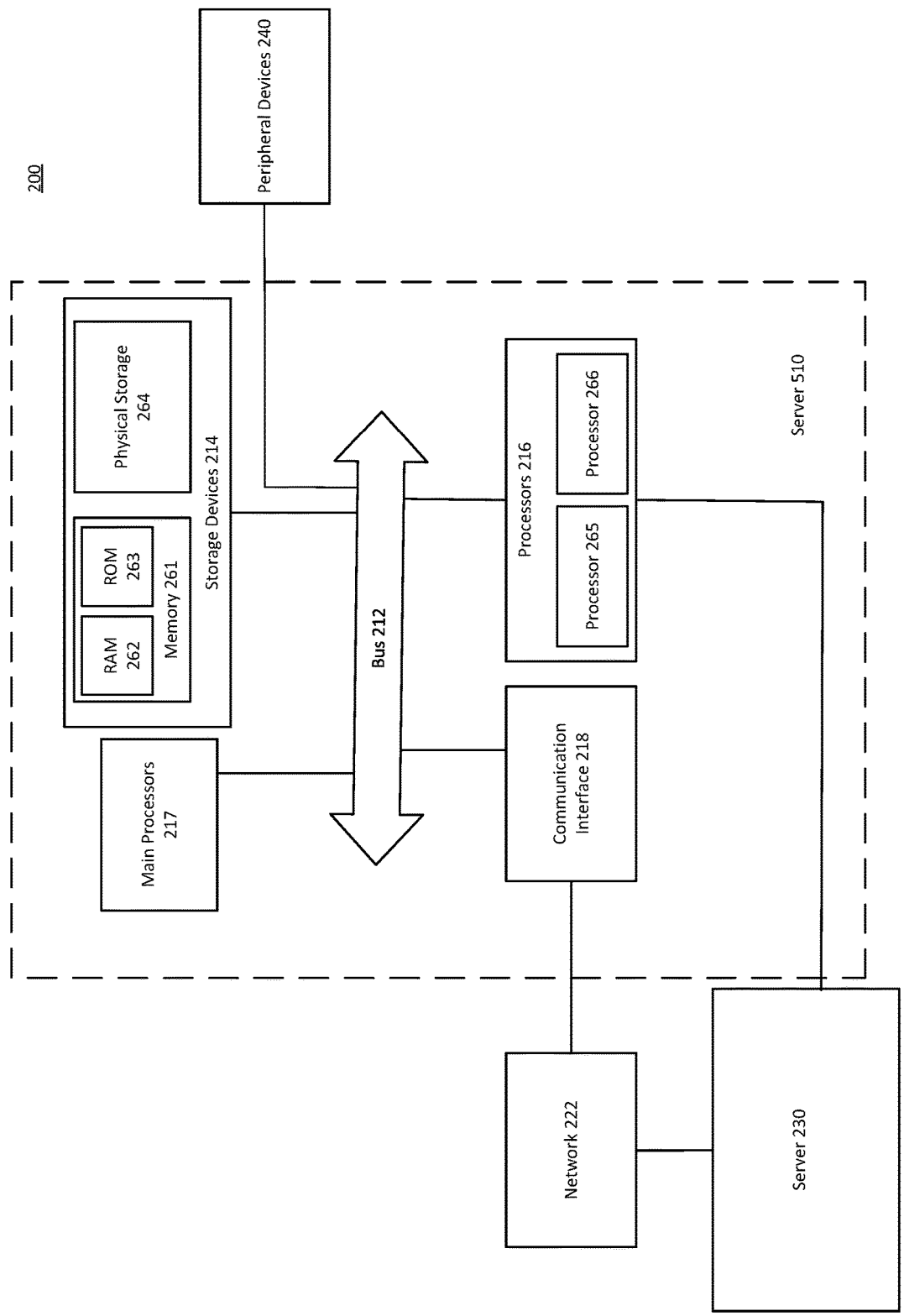
FIG. 2 illustrates a schematic diagram of an example distributed system, according to some embodiments of the present disclosure.

FIG. 2 illustrates a schematic diagram of an example distributed system, according to some embodiments of the present disclosure. According to FIG. 2, server 210 of distributed computing system 200 comprises a bus 212 or other communication mechanisms for communicating information, one or more processors 216 communicatively coupled with bus 212 for processing information, and one or more main processors 217 communicatively coupled with bus 212 for processing information. Processors 216 can be, for example, one or more microprocessors. In some embodiments, one or more processors 216 comprises processor 265 and processor 266, and processor 265 and processor 266 are connected via an inter-chip interconnect of an interconnect topology. Main processors 217 can be, for example, central processing units ("CPUs")

Server 210 can transmit data to or communicate with another server 230 through network 222. Network 222 can be a local network similar to network 160 (as shown in FIG. 1), an internet service provider, Internet, or any combination thereof. Communication interface 218 of server 210 is connected to network 222, which can enable communication with server 230. In addition, server 210 can be coupled via bus 212 to peripheral devices 240, which comprises displays (e.g., cathode ray tube (CRT), liquid crystal display (LCD), touch screen, etc.) and input devices (e.g., keyboard, mouse, soft keypad, etc.).

Server 210 can be implemented using customized hard-wired logic, one or more ASICs or FPGAs, firmware, or program logic that in combination with the server causes server 210 to be a special-purpose machine.

Server 210 further comprises storage devices 214, which may include memory 261 and physical storage 264 (e.g., hard drive, solid-state drive, etc.). Memory 261 may include random access memory (RAM) 262 and read-only memory (ROM) 263. Storage devices 214 can be communicatively coupled with processors 216 and main processors 217 via bus 212. Storage devices 214 may include a main memory, which can be used for storing temporary variables or other intermediate information during execution of instructions to be executed by processors 216 and main processors 217. Such instructions, after being stored in non-transitory storage media accessible to processors 216 and main processors 217, render server 210 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid] state drive, magnetic tape, or any other magnetic data storage medium, a CD-ROM, any other optical data storage medium, any physical medium with patterns of holes, a RAM, a PROM, and an EPROM, a FLASH-EPROM, NVRAM, flash memory, register, cache, any other memory chip or cartridge, and networked versions of the same.

Various forms of media can be involved in carrying one or more sequences of one or more instructions to processors 316 or main processors 217 for execution. For example, the instructions can initially be carried out on a magnetic disk or solid-state drive of a remote computer. The remote computer can load the instructions into its dynamic memory and send the instructions over a telephone line using a modem. A modem local to server 210 can receive the data on the telephone line and use an infrared transmitter to convert the data to an infrared signal. An infrared detector can receive the data carried in the infrared signal, and appropriate circuitry can place the data on bus 212. Bus 212 carries the data to the main memory within storage devices 214, from which processors 216 or main processors 217 retrieves and executes the instructions.

Entity set management system 100 (as shown in FIG. 1) or one or more of its components may reside on either server 210 or 230 and may be executed by processors 216 or 217. In some embodiments, the components of entity set management system 100, processor 110, and ensemble 120 may be spread across multiple servers 210 and 230. For example, processor 110 components 111-113 may be executed on multiple servers.

Figure 3:
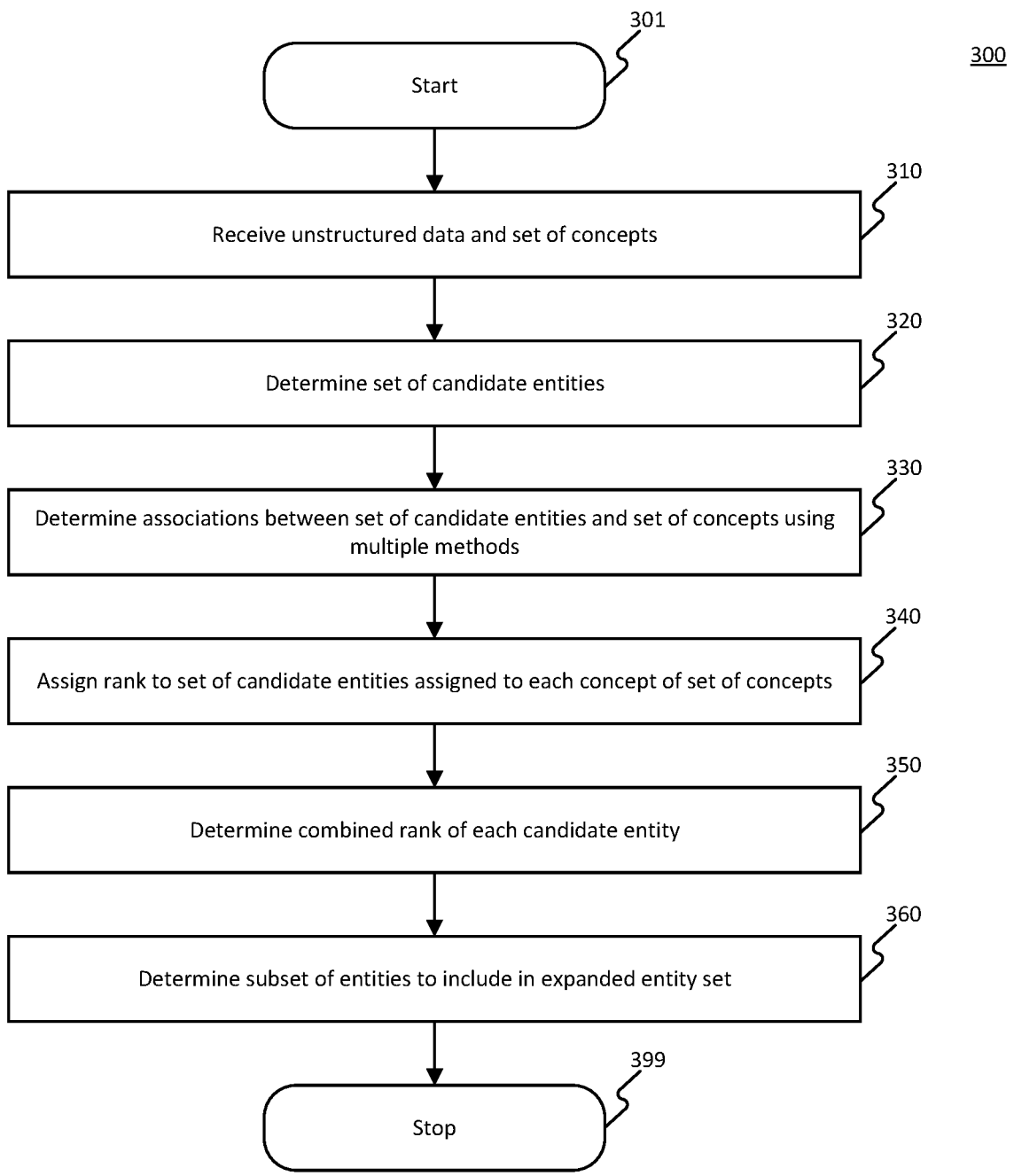
FIG. 3 is a flowchart showing an example method for entity set expansion using an entity set management system, consistent with embodiments of the present disclosure.

FIG. 3 is a flowchart showing an example method for entity expansion using an entity set management system, consistent with embodiments of the present disclosure. The steps of method 300 can be performed by, for example, entity set management system 100 of FIG. 1 executing on or otherwise using the features of distributed computing system 200 of FIG. 2 for purposes of illustration. It is appreciated that the illustrated method 300 can be altered to modify the order of steps and to include additional steps.

In step 310, entity set management system 100 may receive unstructured data (e.g., text corpus 151 of FIG. 1) and a set of concepts (e.g., concepts 152 of FIG. 1) to generate entities set (e.g., entity set 154 of FIG. 1) to associate with unstructured data. Unstructured data may include a text corpus of user generated text, for example, user reviews and or well curated text, for example, Wikipedia or both. In some embodiments, entity set management system 100 may receive data and concepts 152 from user 170 (as shown in FIG. 1) over network 160 (as shown in FIG. 1). In some embodiments, entity set management system 100 may access data and concepts 152 from database 150 (as shown in FIG. 1).

In step 320, entity set management system 100 may determine set of candidate entities (e.g., candidate entities 153 of FIG. 1) from data provided in step 310. Phase extractor 111 may help identify candidate entities 153 from data by identifying keywords and key phrases from data. Entity set management system 100 may evaluate relevancy of keywords and key phrases to context of input data (e.g., text corpus 151 of FIG. 1) when considering including in candidate entities 153. Entity set management system 100 may use a machine learning model for example language model such as BERT, to identify keywords and key phrases. The machine learning model may help identify keywords and key phrases in data by determining their similarity to seed entities 190. Entity set management system 100 may select keywords and key phrases with level of similarity above a threshold level. Entity set management system 100 may dynamically receive threshold level of similarity as input in step 310 or it may be a static value stored in database 150. User 170 may provide a threshold level of similarity value when executing method 300.

In some embodiments, entity set management system 100 may determine the size of each concept of concepts 152 to determine the number of candidate entities 153 to include in entity set 154 (as shown in FIG. 1). Entity set management system 100 may use concept size number of concept size set 155 (as shown in FIG. 1) to extract that number of candidate entities 153 from data. In some embodiments, entity set management system 100 may extract more candidate entities 153 than the concept size number. Entity set management system 100 may extract more candidate entities 153 to ensure meeting the concept size number in concept size set 155 after any filtration of entities in the following steps 330-360. Entity set management system 100 may determine the count of candidate entities 153 to extract from the data based on a concept of concepts 152 used in extracting candidate entities. In some embodiments, entity set management system 100 determines the count of the set of candidate entities to extract from the data based on the domain of the data (e.g., text corpus 151 of FIG. 1).

Entity set management 100 may estimate concept size of concept size set 155 (as shown in FIG. 1) for a concept in concepts 152 (as shown in FIG. 1) based on likelihood of extracting entities of entity set 154 (as shown in FIG. 1) to associate with a concept of concepts 152. For example, in text corpus 151, if the likelihood of extracting candidate entity (e.g., TV, Wi-Fi) of a concept (e.g., Hotel Room Amenities) follows a uniform distribution, then uniformly sampling at random can provide a very good estimate of concept size. In another example, concept size of concept size set 155 may be determined based on the method of extraction of entities of entity set 154 from text corpus 151. For example, entity set management system 100 using sub-gaussian distribution to extract entities may extract a fixed number of entities uniformly at random for each concept. In some embodiments, concept size values may be evaluated to guarantee for errors using methods such as Hoeffding's inequality, Union Bound, and Bernoulli Trial.

Entity set management system 100 may improve estimation of concept size of concept size set 155 based on the number of entities extracted for a concept. In some embodiments, a user (e.g., user 170) may define budget (such as time or error tolerance) to dictate how many entities to extract per concept from text corpus 151.

In step 330, entity set management system 100 may determine associations between candidate entities 153 determined in step 320, with concepts 152 received in step 310. Entity set management system 100 may use multiple entity set expansion methods to determine which entity of candidate entities 153 is associated with each concept of concepts 152. In some embodiments, entity set management system 100 may use string based entity set expansion method involving the processing of keywords and key phrases determined as candidate entities in step 320. The entity set expansion methods may include applying a machine learning model to determine associations between candidate entities 153 and concepts 152.

Entity set management system 100 may perform a string based method to identify associations between candidate entities and concepts 152 by determining embeddings of candidate entities 153 and concepts 152. Entity set management system 100 may determine the similarity between embeddings of concepts 152 and embeddings of candidate entities 153 to determine associations. Entity set management system 100 may associate a candidate entity to a concept if the similarity of their embeddings is above a threshold level. Entity set management system 100 may dynamically receive a threshold level of similarity of embeddings as input in step 310, or it may be a static value stored in database 150. User 170 may provide a threshold level of similarity value when executing method 300.

In step 340, entity set management system 100 may assign rank to candidate entities 153 associated with each concept of set of concepts 152 in step 330. Entity set management system 100 may assign a rank to a candidate entity for each entity set expansion method of the plurality of methods used to determine associations in step 330. Entity set management system 100 may assign a rank based on the amount of similarity between a candidate entity and a concept of concepts 152. In some embodiments, entity set management system 100 may assign a rank to a candidate entity associated with a concept based on the similarity between a candidate entity and other candidate entities of the set of candidate entities.

In step 350, entity set management system 100 may determine combined rank of each candidate entity. Entity set management system determines combined rank by combining different ranks assigned to each candidate entity in step 340 to generate final rank of candidate entity associated with a concept in concepts 152. Entity set management system 100 may combine ranks by averaging the rank values assigned by each entity set expansion method to a candidate entity associated with a concept of concepts 152 in step 340. In some embodiments, entity set management system 100 may use mean average precision value for recall rates of machine learning models used in different methods to combine ranks assigned to candidate entities. The mean average precision value may be multiplied to the assigned rank to get a weighted average of multiple ranks assigned to each candidate entity associated with a concept of concepts 152.

Two entity set expansion methods with high compatibility based on diversity in correct entity predictions as determined in step 330 may be used to achieve higher performance when combined using ranks assigned to candidate entities by each of the methods.

In step 360, entity set management system 100 may determine a subset of entities to include in the expanded entity set 154 (as shown in FIG. 1) stored in database 150. Entity set management system 100 may determine a subset of entities based on the candidate entities 153 associated with each concept of concepts 152. A subset of entities may be identified based on the combined ranks of candidate entities and the concept size number in concept size set 155 (as shown in FIG. 1). For example, entity set management system 100 may select top-k candidate entities as a subset of entities matching the concept size number of an associated concept of concepts 152. A subset of entities may include multifaceted entities, vague entities, and non-named entities. In some embodiments, entity set management system 100 may use the subset of entities to generate a knowledge graph based on the subset of the entities.

In some embodiments, entity set management system 100 may evaluate effectiveness of each method used in step 330 to determine associations between candidate entities and concepts 152. Entity set management system 100 may use the amount of different types of entities (e.g., multifaceted entities, vague entities, and non-named entities) in the final subset of entities includes in entity set 154 (as shown in FIG. 1) to evaluate the effectiveness of a method.

Entity set management system 100, upon completion of step 360, completes (step 399) executing method 300 on distributed computing system 200.

Example embodiments are described above with reference to flowchart illustrations or block diagrams of methods, apparatus (systems), and computer program products. It will be understood that each block of the flowchart illustrations or block diagrams, and combinations of blocks in the flowchart illustrations or block diagrams, can be implemented by computer program product or instructions on a computer program product. These computer program instructions can be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions can also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions can also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart or block diagram block or blocks.

Any combination of one or more computer readable medium(s) can be utilized. The computer readable medium can be a non-transitory computer readable storage medium. In the context of this document, a computer readable storage medium can be any tangible medium that can contain or store a program for use by or in connection with an instruction execution system, apparatus, or device.

Program code embodied on a computer readable medium can be transmitted using any appropriate medium, including but not limited to wireless, wireline, optical fiber cable, RF, IR, etc., or any suitable combination of the foregoing.

Computer program code for carrying out operations, for example, embodiments can be written in any combination of one or more programming languages, including an object-oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer, and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). The computer program code can be compiled into object code that can be executed by a processor or can be partially compiled into intermediary object code or interpreted in an interpreter, just-in-time compiler, or a virtual machine environment intended for executing computer program code.

The flowchart and block diagrams in the figures illustrate examples of the architecture, functionality, and operation of possible implementations of systems, methods, and computer program products according to various embodiments. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment can be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer readable medium including instructions that are executable by one or more processors to cause a system to perform operations for performing entity set expansion, the operations comprising:
   receiving unstructured data and a set of concepts associated with the unstructured data;
   determining, using a language model, a set of candidate entities in the unstructured data associated with the set of concepts, and contexts of the unstructured data;
   determining, using a plurality of entity set expansion methods, associations between each candidate entity in the set of candidate entities and each concept of the set of concepts, wherein each candidate entity is assigned a rank for each method of the plurality of entity set expansion methods, wherein each assigned rank is biased based on one of the determined contexts of the unstructured data, wherein the determined contexts differ based on a respective method of the plurality of entity set expansion methods;
   determining a combined rank of each candidate entity of the set of candidate entities, wherein the combined rank of each candidate entity is based on the assigned rank of each candidate entity for each method of the plurality of entity set expansion methods; and determining a subset of entities of the set of candidate entities based on the combined rank of each candidate entity, wherein the subset of entities forms an expanded entity set associated with the unstructured data.

2. The non-transitory computer readable medium of claim 1, wherein the operations further comprise identifying one or more combinations of the plurality of entity expansion methods used based on the determined subset of entities and one or more computed benchmarks.

3. The non-transitory computer readable medium of claim 1, wherein determining the set of candidate entities in the unstructured data is based on a similarity between the set of candidate entities and the set of concepts.

4. The non-transitory computer readable medium of claim 1, wherein determining the set of candidate entities in the unstructured data further comprises:
 determining a concept size number for each concept of the set of concepts; and
 determining the set of candidate entities based on the concept size number of each concept of the set of concepts.

5. The non-transitory computer readable medium of claim 4, wherein determining the concept size number for each concept of the set of concepts further comprises:
 determining a count of the set of candidate entities to extract from the unstructured data.

6. The non-transitory computer readable medium of claim 5, wherein determining the count of the set of candidate entities to extract from the unstructured data is based on the set of concepts.

7. The non-transitory computer readable medium of claim 5, wherein determining the count of the set of candidate entities to extract from the unstructured data is based on a domain of the unstructured data.

8. The non-transitory computer readable medium of claim 1, wherein determining the associations between each candidate entity in the set of candidate entities and each concept of the set of concepts further comprises:
 determining embeddings of each candidate entity of the set of candidate entities;
 determining embeddings of each concept of the set of concepts; and
 determining a similarity between the embeddings of each entity and the embeddings of each concept.

9. The non-transitory computer readable medium of claim 1, wherein each assigned rank is further based on a similarity between a candidate entity of the set of candidate entities and a concept of the set of concepts.

10. The non-transitory computer readable medium of claim 1, wherein each assigned rank is further based on a similarity between two candidate entities of the set of candidate entities.

11. The non-transitory computer readable medium of claim 1, wherein determining the combined rank of each candidate entity further comprises:
 measuring and evaluating a compatibility of a first method and a second method of the plurality of entity set expansion methods.

12. The non-transitory computer readable medium of claim 11, wherein the first method is compatible with the second method when a first set of candidate entities of the set of candidate entities associated with the set of concepts by the first method are divergent from a second set of candidate entities associated with the set of concepts.

13. The non-transitory computer readable medium of claim 1, wherein the subset of entities includes multifaceted entities, an amount of vague entities, and an amount of non-named entities.

14. The non-transitory computer readable medium of claim 1, wherein the operations further comprise:
 generating a knowledge graph based on the subset of entities.

15. The non-transitory computer readable medium of claim 1, wherein the operations further comprise:
 evaluating an effectiveness of one of the plurality of entity set expansion methods to determine associations between each candidate entity in the set of candidate entities and each concept of the set of concepts.

16. The non-transitory computer readable medium of claim 15, wherein the effectiveness of the one of the plurality of entity set expansion methods is evaluated based on at least one of: an amount of multifaceted entities, an amount of vague entities, or an amount of non-named entities.

17. A method performed by a system for performing entity set expansion utilizing an entity set expansion system, the method comprising:
 receiving unstructured data and a set of concepts associated with the unstructured data;
 determining, using a language model, a set of candidate entities in the data associated with the set of concepts; and contexts of the unstructured data;
 determining, using a plurality of entity set expansion methods, associations between each candidate entity in the set of candidate entities and each concept of the set of concepts, wherein each candidate entity is assigned a rank for each method of the plurality of entity set expansion methods, wherein each assigned rank is biased based on one of the determined contexts of the unstructured data, wherein the determined contexts differ based on a respective method of the plurality of entity set expansion methods;
 determining a combined rank of each candidate entity of the set of candidate entities, wherein the combined rank of each candidate entity is based on the assigned rank of each candidate entity for each method of the plurality of entity set expansion methods; and
 determining a subset of entities of the set of candidate entities based on the combined rank of each candidate entity, wherein the subset of entities forms an expanded entity set associated with the unstructured data.

18. The method of claim 17, wherein determining the set of candidate entities in the unstructured data further comprises:
 determining a concept size number of each concept of the set of concepts; and
 determining the set of candidate entities based on the concept size number of each concept of the set of concepts.

19. The method of claim 17, wherein determining the associations between each candidate entity in the set of candidate entities and each concept of the set of concepts further comprises:
 determining embeddings of each entity of the one or more entities;
 determining embeddings of each concept of the set of concepts; and
 determining a similarity between the embeddings of each entity and the embeddings of each concept.

20. An entity set expansion system comprising:
one or more memory devices storing processor executable instructions; and
one or more processors configured to execute instructions to cause the entity set expansion system to perform operations, the operations comprising:
- receiving unstructured data and a set of concepts associated with the unstructured data;
- determining, using a language model, a set of candidate entities in the data associated with the set of concepts, and contexts of the unstructured data;
- determining, using a plurality of entity set expansion methods, associations between each candidate entity in the set of candidate entities and each concept of the set of concepts, wherein each candidate entity is assigned a rank for each method of the plurality of entity set expansion methods, wherein each assigned rank is biased based on one of the determined contexts of the unstructured data, wherein the determined contexts differ based on a respective method of the plurality of entity set expansion methods;
- determining a combined rank of each candidate entity of the set of candidate entities, wherein the combined rank of each candidate entity is based on the assigned rank of each candidate entity for each method of the plurality of entity set expansion methods; and
- determining a subset of entities of the set of candidate entities based on the combined rank of each candidate entity, wherein the subset of entities forms an expanded entity set associated with the unstructured data.

* * * * *